United States Patent
Tsukamoto et al.

[11] Patent Number: 5,930,255
[45] Date of Patent: Jul. 27, 1999

[54] METHOD OF SETTING A RELAYING PATH IN A COMMUNICATION NETWORK

[75] Inventors: Takahiro Tsukamoto, Houya; Koumei Takahashi, Yokohama, both of Japan

[73] Assignee: Canon Kabushiki Kaisha, Tokyo, Japan

[21] Appl. No.: 08/591,305

[22] Filed: Jan. 25, 1996

[30] Foreign Application Priority Data

Jan. 31, 1995 [JP] Japan .................................... 7-034244

[51] Int. Cl.$^6$ .................................................. H04L 12/56
[52] U.S. Cl. ........................ 370/397; 370/400; 370/410
[58] Field of Search ................................... 370/238, 254, 370/249, 255, 395–397, 409, 357, 401, 402, 408, 355, 389, 400, 465, 466, 410

[56] References Cited

U.S. PATENT DOCUMENTS

| | | | |
|---|---|---|---|
| 5,280,476 | 1/1994 | Kojima et al. .......................... | 370/397 |
| 5,440,547 | 8/1995 | Easki et al. ............................. | 370/395 |
| 5,548,589 | 8/1996 | Jeon et al. .............................. | 370/399 |
| 5,600,644 | 2/1997 | Chang et al. .......................... | 370/404 |
| 5,633,869 | 5/1997 | Burnett et al. ......................... | 370/396 |

*Primary Examiner*—Chau Nguyen
*Attorney, Agent, or Firm*—Morgan & Finnegan, LLP

[57] ABSTRACT

A first communication terminal broadcasts an ARP request frame which includes an IP address to a network, a second communication terminal which has the identical IP address to the one included in the ARP request frame transmits an ARP response frame which is added with a MAC address, to a second ATM terminal adapter, then the second ATM terminal adapter temporarily stores the ARP response frame. The second ATM terminal adapter broadcasts a virtual path request frame to a first ATM terminal adapter, and branching units which are in a relaying path are specified in accordance with interface information. Then, after a virtual path response frame is transmitted to the second ATM terminal adapter by following back the branching units which are specified during the virtual path request frame was transmitted, the temporarily stored ARP response is transmitted to the first communication terminal, thereby easily setting a most effective relaying path while exchanging information via LANs which are connected to an ATM network.

34 Claims, 13 Drawing Sheets

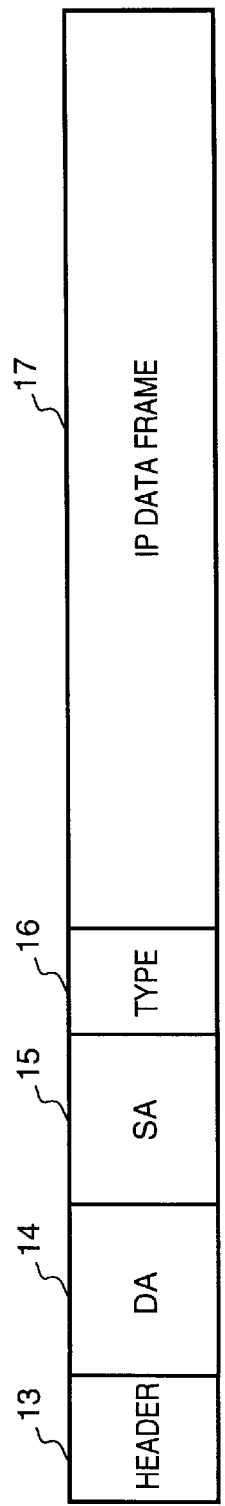
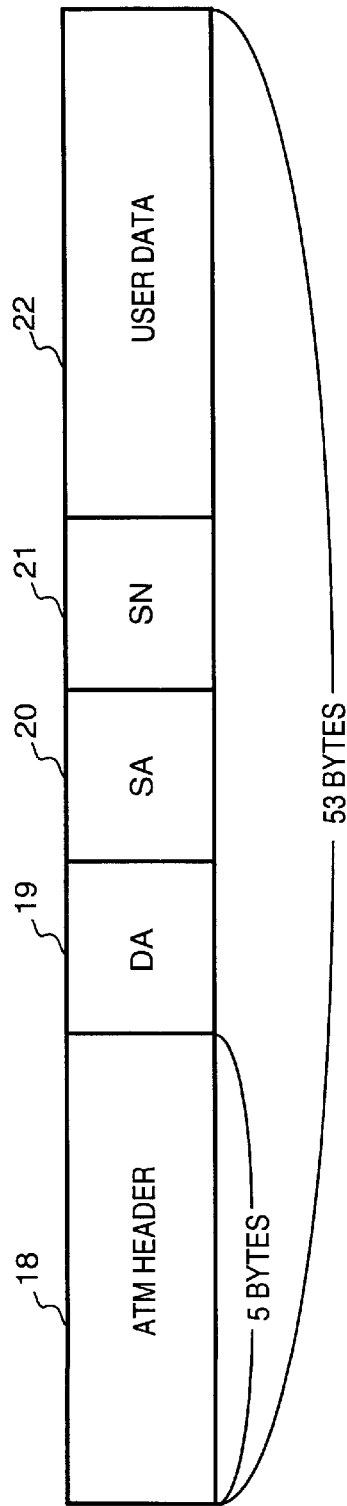
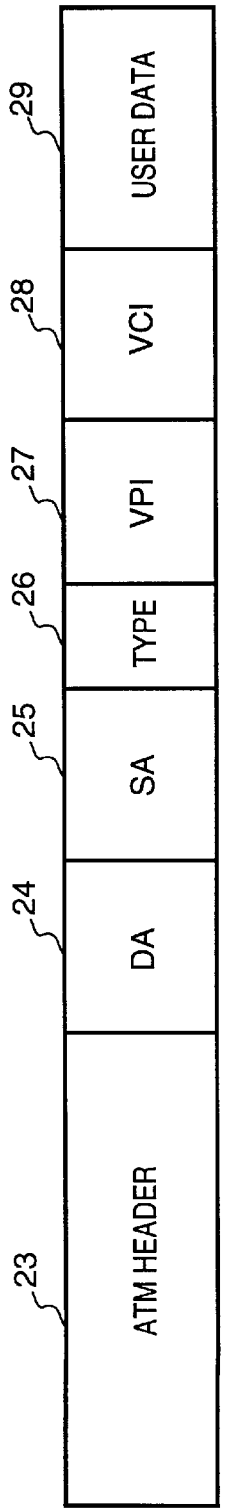

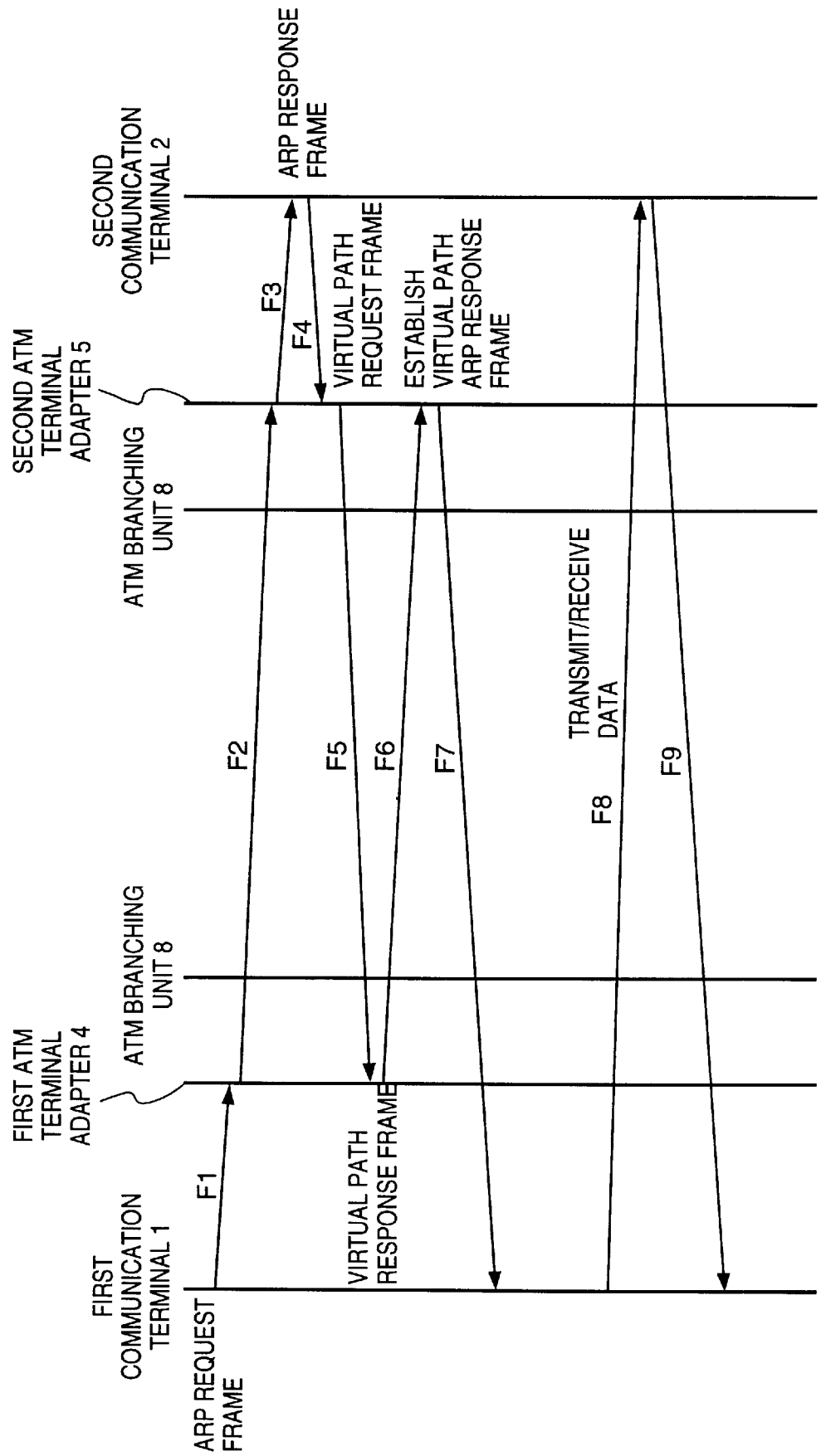

METHOD OF SETTING A RELAYING PATH IN A COMMUNICATION NETWORK

BACKGROUND OF THE INVENTION

The present invention relates to a method of setting a relaying path in a communication network and, more particularly, to a method of setting a relaying path in a communication network when communicating by using an asynchronous transfer mode.

Conventionally, local area networks (LANs), such as the Ethernet (based on IEEE 802.3) and the token ring system (based on IEEE 802.5), are known and used to perform data communication in a limited and relatively small area, such as inside a building or a building site.

Meanwhile, in view of a network of the next generation, an asynchronous transfer mode (ATM), a simplified protocol, has been developed aimed for multimedia and high speed data transmission, and the standardization of ATM has been discussed. In the ATM technique, information to be sent is divided into fixed-sized (53 bytes) blocks, and each of the blocks is made into an ATM cell, then the ATM cells are sent out sequentially. Thereby, it is possible to reduce exchange delay while keeping high transmission efficiency as in the conventional packet exchange.

As a communication system using the ATM technique, a technique to use an ATM exchange apparatus for communication in a public network has been developed, and an ATM-LAN has also been developed, applied with the ATM, capable of dealing with a multi-media information, although it is in a small scale.

The conventional LAN capable of dealing with static data, such as text data, exists and is used separately from the ATM-LAN for multi-media capable of dealing with a dynamic data, such as sound and an image. However, there is a prospect that the conventional LAN and the ATM-LAN coexist and are used together. In such a case, it is expected that there will be a demand for realizing a system in which a protocol for the LAN, such as the Ethernet, is used for communication between communication terminals, whereas ATM-LAN is used at the transfer unit so as to speed up the exchange process.

Therefore, in order to effectively realize the aforesaid system, it is necessary to adjust between a relaying path setting (routing), using a conventional protocol for LAN, such as the Ethernet, and establishment of a virtual path on the ATM network.

SUMMARY OF THE INVENTION

The present invention has been made in consideration of the above situation, and has as its object to provide a method of setting a relaying path in a communication network capable of establishing a virtual path when connecting to the ATM network by using a LAN protocol, and performing information communication by using the virtual path.

It is another object of the present invention to provide a method of setting a relaying path in a communication network capable of easily routing a relaying path when information is exchanged via a LAN connected to the ATM network.

It is still another object of the present invention to provide a method of setting a relaying path in a communication network capable of exchanging an ATM cell via a high-speed and most effective route by using data in a table which is set while setting the relaying path.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a frame configuration showing a format of an ARP request/response frame;

FIG. 4 is a frame configuration showing a format of an ATM cell;

FIG. 5 is a frame configuration showing a format of a virtual path request/response frame;

FIG. 6 is an explanatory view showing a routing sequence in a network;

DETAILED DESCRIPTION OF THE PREFERRED EMBODIMENTS

Preferred embodiments of the present invention will be described in detail in accordance with the accompanying drawings.

<First Embodiment>

Figure 1:
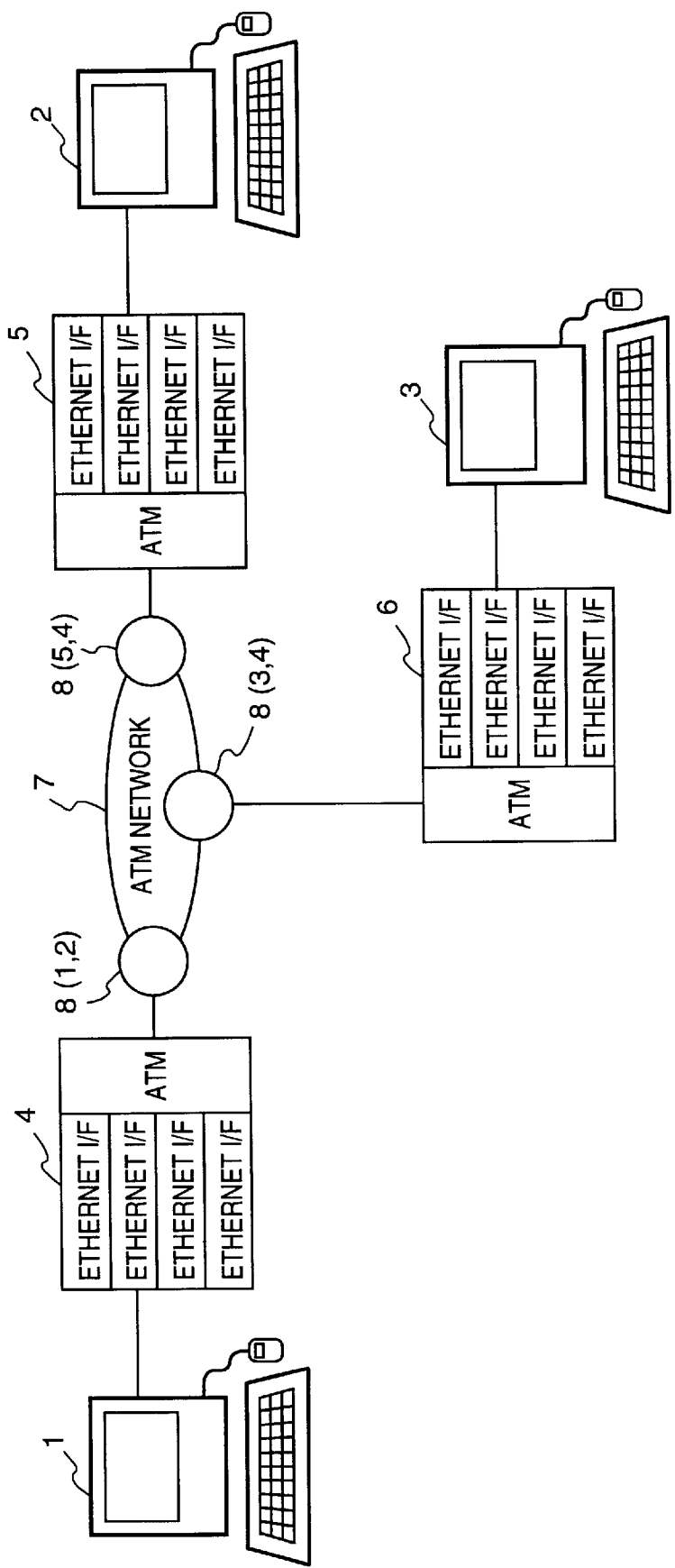
FIG. 1 is an overall view illustrating an example of a configuration of a communication system according to a first embodiment of the present invention.

FIG. 1 is an overall view illustrating an example of a configuration of a communication system according to a first embodiment of the present invention. The communication system can be connected to a plurality of communication terminals (first to third communication terminals denoted by 1 to 3 in FIG. 1) having an Ethernet interface function and four other communication terminals, at maximum. Further, the communication system includes a plurality of ATM terminal adapters (first to third ATM terminal adapters denoted by 4 to 6 in FIG. 1) which change predetermined request information, sent from the aforesaid communication terminals in a predetermined format, into ATM cells and which change ATM cells into predetermined request information in a predetermined format, and a plurality of ATM branching units 8(m, n) (the switching network consist of an m×n network, but only the ATM branching units 8(1, 2), 8(5, 4), and 8(3, 4) are shown in FIG. 1).

Figure 2:
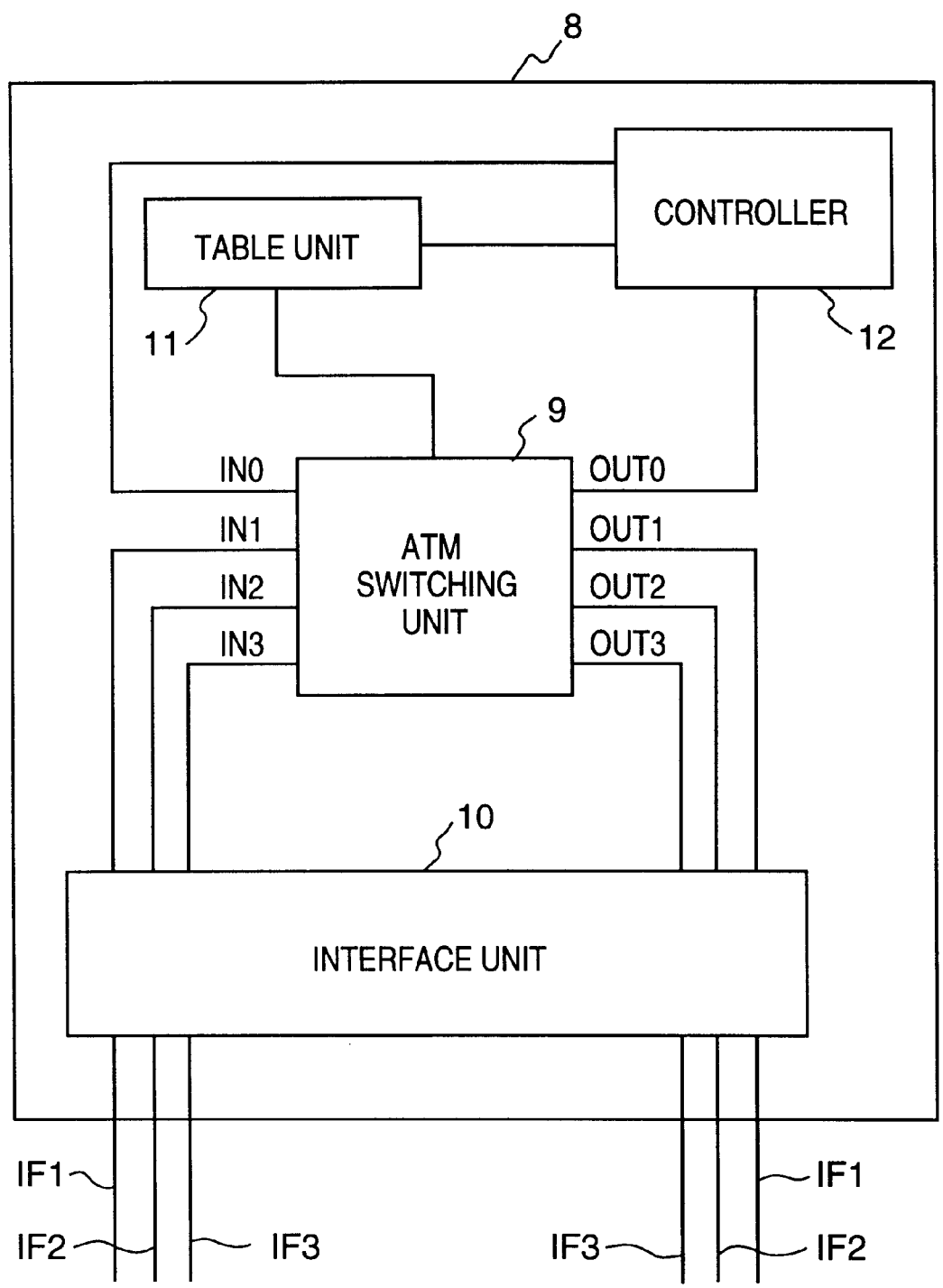
FIG. 2 is a block diagram illustrating an internal configuration of an ATM switching apparatus.

The ATM branching unit 8, as shown in FIG. 2, comprises an ATM switching unit 9, having four input ports and four output ports, for exchanging an ATM cell, an interface unit 10, having three input ports and three output ports, for interfacing between other ATM branching units 8 which are on the ATM network 7 and the first to third ATM terminal adapters 4 to 6, a table unit 11, consists of RAM or the like, containing a table of interface information sent from the interface unit 10, virtual path identifiers (referred by "VPI", hereinafter) and virtual channel identifiers (referred by "VCI" hereinafter) which are for controlling input and output to/from the ATM switching unit 9 stored in the table, and a controller 12 for controlling the ATM switching unit 9, the interface 10, and the table unit 11. Further, the table unit 11 also stores VPI and VCI of the controller 12.

The ATM branching unit 8 inputs and outputs interface information to/from the controller 12 via three input ports and three output ports of the interface unit 10. More specifically, the interface information from the interface unit 10 as well as VPI and VCI are rewritten by the table unit 11, and the information of values in the rewritten table is outputted from each port of the interface unit 10.

In the communication system of the present invention, by following an address resolution protocol (ARP) for LAN, media access control address (referred by "MAC address", hereinafter), i.e., a physical address on the LAN, is obtained, a virtual path is established and outgoing information is transferred in accordance with the MAC address. For example, when information is sent for the first time to a destination, the MAC address of the destination is not known. In such the case, according to the ARP, an Internet Protocol address of the destination communication terminal (first identification information), i.e., identification information for identifying the communication terminal, is written in an ARP request format, and the ARP request frame is broadcasted onto the ATM network 7 without specifying the destination. Then, only the communication terminal, having the identical IP address as the one included in the ARP request frame, adds its MAC address (second identification information), i.e., identification information used for controlling media access in the ATM network 7, and sends out an ARP response frame which is put on routing.

FIG. 3 is a frame configuration showing a format of the ARP request/response frame, which is made of 64 bytes in total.

More specifically, a destination address (DA) field 14 in the ARP request frame which is subsequent to a header field 13 is written with "FFFFFFFFFFFF", showing all "1"s, so as to broadcast without specifying the destination, and in the ARP response frame, written with a MAC address of a communication terminal which transmitted the ARP request frame (e.g., the first communication terminal 1). A source address (SA) field 15 in the ARP request frame is written with the MAC address of the communication terminal which transmitted the ARP request frame (e.g., the first communication terminal 1), and in the ARP response frame, written with the MAC address of the communication terminal which was the destination of the ARP request frame (e.g., the second communication terminal 2). In a type field 16, a bit showing the type of an ARP frame, namely a bit for specifying whether it is an ARP request frame or an ARP response is written. Further, an IP data frame field 17 is written with an IP address of a specific destination communication terminal, e.g., the second communication terminal 2.

FIG. 4 is a frame configuration showing a format of an ATM cell. An ARP request frame sent from a originating communication terminal (e.g., the first communication terminal 1) is divided into ATM cells of fixed length of 53 bytes by an ATM terminal adapter of the originating side (e.g., the first ATM terminal adapter 4).

Therefore, since the ARP request frame is configured with 64 bytes while the ATM cell is configured with 53 bytes, data of the ARP request frame is divided into two ATM cells.

More specifically, in each of the ATM cells, an ATM header field 18 is configured with 5 bytes and includes VPI and VCI for identifying connection to which the ATM cell belongs. The VPI and VCI values of the controller 9 of the ATM branching unit 8 are written to the ATM header field 18 as the VPI and the VCI values. Now, assume that all the VPI and the VCI values of the controller 9 of the ATM branching unit 8 on the ATM network 7 are the same. In this case, by using the value in all the ATM branching units 8 when they send the ARP request frame, the ARP request frame is broadcasted to all the communication terminals.

Further, since a value for broadcasting and a MAC address of the source communication terminal (e.g., the first communication terminal) are to be set in a DA field 19 and an SA field 20, the values of the DA field 14 and the SA field 15 are respectively copied to the DA field 19 and the SA field 20. Further, the data of the ARP request frame is divided into two ATM cells, as described above, sequence number information is written into a sequence number (SN) field 21 so that the order of the ATM cells can be identified, and 48 bytes, excluding the ATM header field 18 (5 bytes), are assigned as DA 19, SA 29, SN 21 and a user data field 22. FIG. 5 is a frame configuration showing a format of a virtual path request/response frame. When the ATM terminal adapter in the destination side (e.g., the second ATM terminal adapter 5) receives an ARP response frame from the communication terminal in the destination side (e.g., the second communication terminal 2), after a predetermined process is performed, the ATM terminal adapter 5 sends out a virtual path request frame or the ATM terminal adapter 4 sends out a virtual path response frame onto the network 7, and negotiation is performed between the ATM terminal adapters (e.g., between the first ATM terminal adapter 4 and the second ATM terminal adapter 5).

As for the virtual path request frame, specific VPI and VCI of the controller 9 in the ATM branching unit 8 is written as the VPI and VCI in an ATM header field 23 for broadcasting. Further, as for the virtual path response frame, VPI and VCI of an ATM branching unit on the decided route are written. In a subsequent DA field 24, the value of the DA field 14 of the ARP response frame is copied in the virtual path request frame, while the value of the SA field 15 of the ARP response frame is copied in the virtual path response frame. Similarly, the value of the SA field 15 of the ARP response frame is copied to an SA field 25 in the virtual path request frame, whereas the value of the DA field 14 of the ARP response frame is copied to the SA field 25 in the virtual path response frame. A type field 26 is written with a bit pattern indicating a type of the frame, namely either the virtual path request frame or the virtual path response frame. Further, VPI and VCI values of a neighboring transmitting side which transmits a frame, necessary for setting a transmission route are written in a VPI field 27 and a VCI field 28, and user information is written in a user data field 29.

Next, referring to FIGS. 6 to 11, a case for routing between the first communication terminal 1 and the second communication terminal 2 will be described in detail.

FIG. 6 is an explanatory view showing a routing sequence.

First, the first communication terminal 1 sends an ARP request frame (FIG. 3) toward the first ATM terminal adapter 4 (F1).

Figure 7:
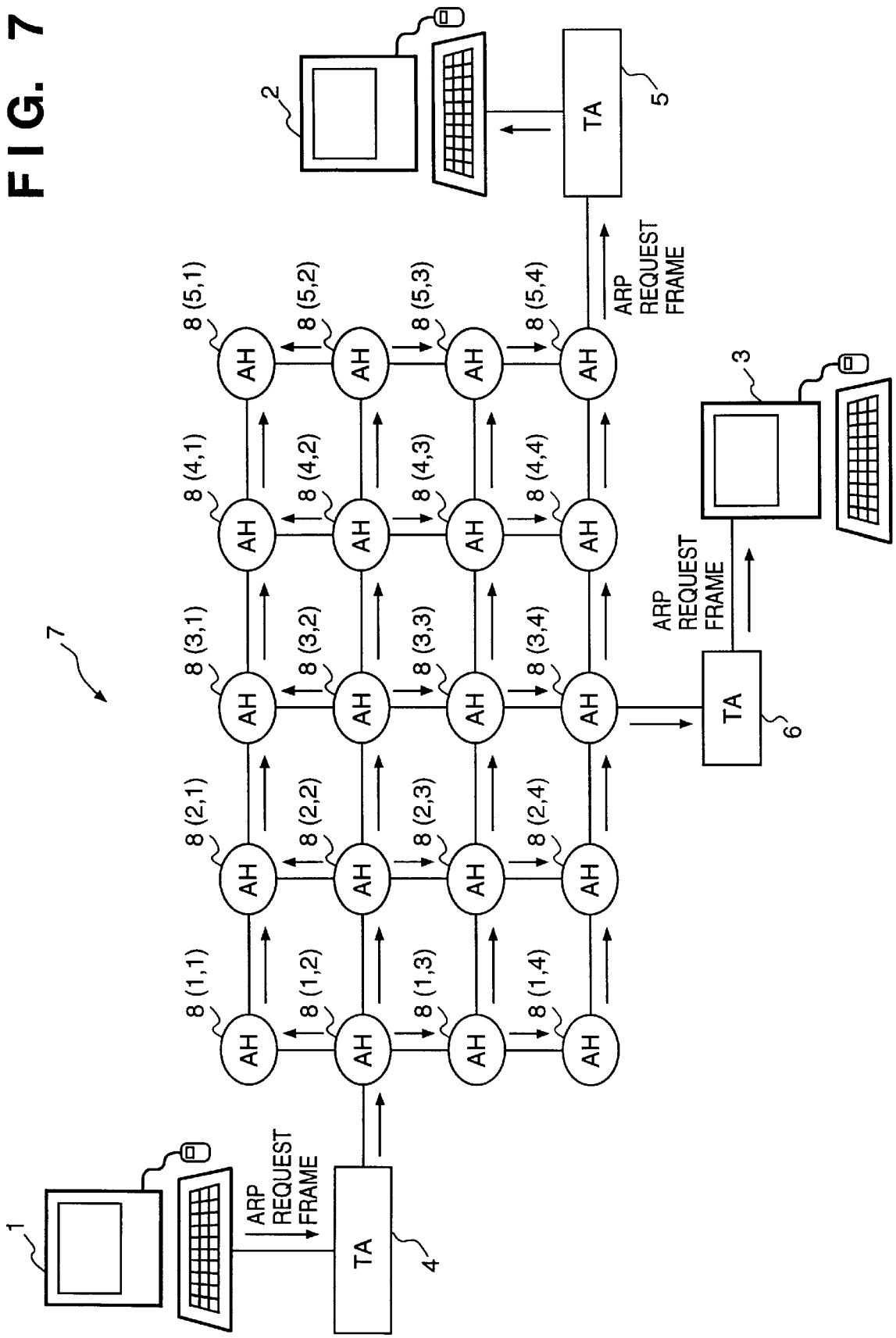
FIG. 7 is an explanatory view when an ARP request frame is broadcasted to the ATM branching units on a network.

Then, the first ATM terminal adapter 4, received the ARP request frame, changes the ARP request frame into two ATM cells, and broadcasts the ATM cells to the ATM branching units 8 on the network 7 as shown in FIG. 7. After the ATM cells reached the ATM branching terminal 8(3, 4), they are transferred to the third ATM terminal adapter 6 connected to the ATM branching terminal 8(3, 4). Similarly, after the ATM cells reached the ATM branching unit 8(5, 4), they are transferred to the second ATM terminal adapter 5 connected to the ATM branching unit 8(5, 4) (F2).

Thereafter, the second and third ATM terminal adapters 5 and 6 change the received ATM cells into the ARP request frame (FIG. 3), and transfer it to the respective second and third communication terminals 2 and 3 (F3).

Then, the third communication terminal 3 determines whether or not the IP address written in the IP data frame field 17 of the ARP request frame matches to the IP address of the third communication terminal 3. In this example, the IP address of the second communication terminal 2 is written in the IP data frame field 17 of the ARP request frame so as to establish a routing between the first communication terminal 1 and the second communication terminal 2. Therefore, the IP addresses do not match in the third communication terminal 3, so the ARP request frame is ignored and abandoned in the third communication terminal 3.

Meanwhile, the second communication terminal 2 also determines whether or not the IP address written in the ARP request frame matches to the IP address of the second communication terminal 2, and determines that they are identical because of the aforesaid reason, in this embodiment. Thereafter, the second communication terminal 2 writes the MAC address of the first communication terminal 1 in the DA field of an ARP response frame, and writes the MAC address of itself in the SA field, then sends the ARP response frame to the second ATM terminal adapter 5 (F4).

Figure 8:
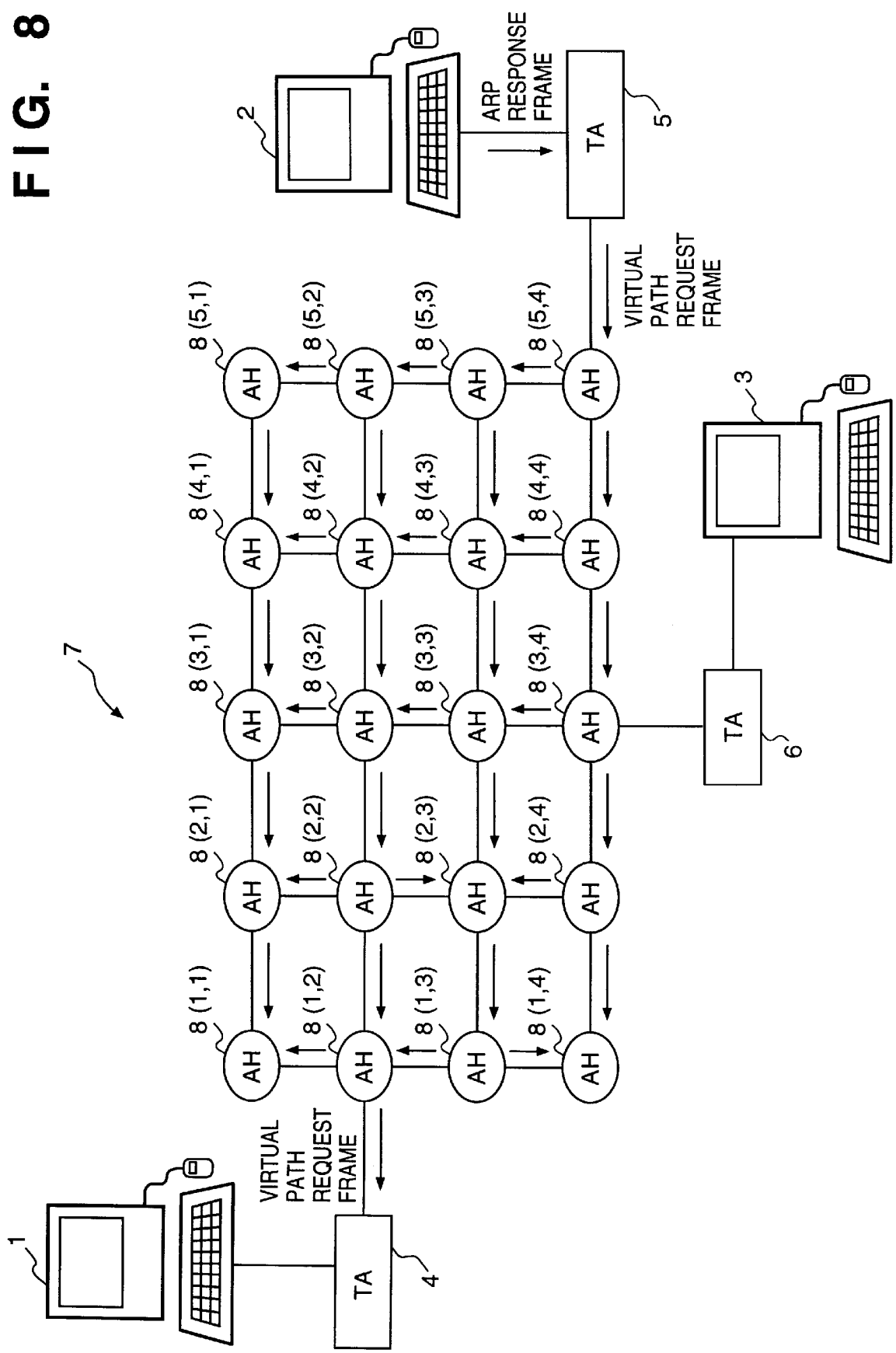
FIG. 8 is an explanatory view when an virtual path request frame is broadcasted to the ATM branching units on a network.

Next, the second ATM terminal adapter 5, which received the ARP response frame, temporarily stores the content of the ARP response frame in a storage unit (not shown) of itself, then broadcasts a virtual path request frame (FIG. 5) toward the first ATM terminal adapter 4 onto the network 7, as shown in FIG. 8. In the virtual path request frame, the MAC address of the first communication terminal 1 is set in the DA field, and the MAC address of the second communication terminal 2 is set in the SA field. At this time, each ATM branching unit 8 stores information on an interface (referred as "interface information", hereinafter) through which the virtual path request frame arrived at the ATM branching unit 8 first, and VPI and VCI values of a neighboring ATM branching which is connected to the aforesaid interface, among the virtual path request frames entered through a plurality of interfaces (e.g., IF1 to IF3 in FIG. 2), in the table unit 11 via the controller 12. In this case, the ATM branching unit 8(5, 4) receives only one virtual path request frame from the ATM terminal adapter 5, information on the interface through which the virtual path request frame is sent from the ATM terminal adapter 5 and the VPI and VCI values in the received virtual path request frame are stored in the table unit 11. Then the ATM branching unit 8(5, 4) broadcasts the virtual path request frame to the ATM branching units 8(5, 3) and 8(4, 4). The ATM branching unit 8(4, 4) receives the virtual path request frames from the ATM branching units 8(4, 3) and 8(5, 4), and the interface information and the VPI and VCI values, based on the request frame which is arrived at the ATM branching unit 8(4, 4) first, are stored in the table unit 11. The example of FIG. 9 shows a case where the virtual path request frame from the ATM branching unit 8(5, 4) arrived at the ATM branching unit 8(4, 4) first.

In the similar manner, all the ATM branching units 8 store the interface information and the VPI and VCI values, based on the virtual path request frame which arrived first, in the tables 11. Accordingly, a most effective route, as shown in FIG. 9, in one direction is set. Then, when the virtual path request frame arrives at the first ATM terminal adapter 4 via the ATM branching unit 8(1, 2), the first ATM terminal adapter 4 recognizes the virtual path request frame (F5). In this example, the first ATM terminal adapter 4 determines whether or not the MAC address written in the DA field of the virtual path request frame matches to the MAC address of the first communication terminal 1.

Figure 9:
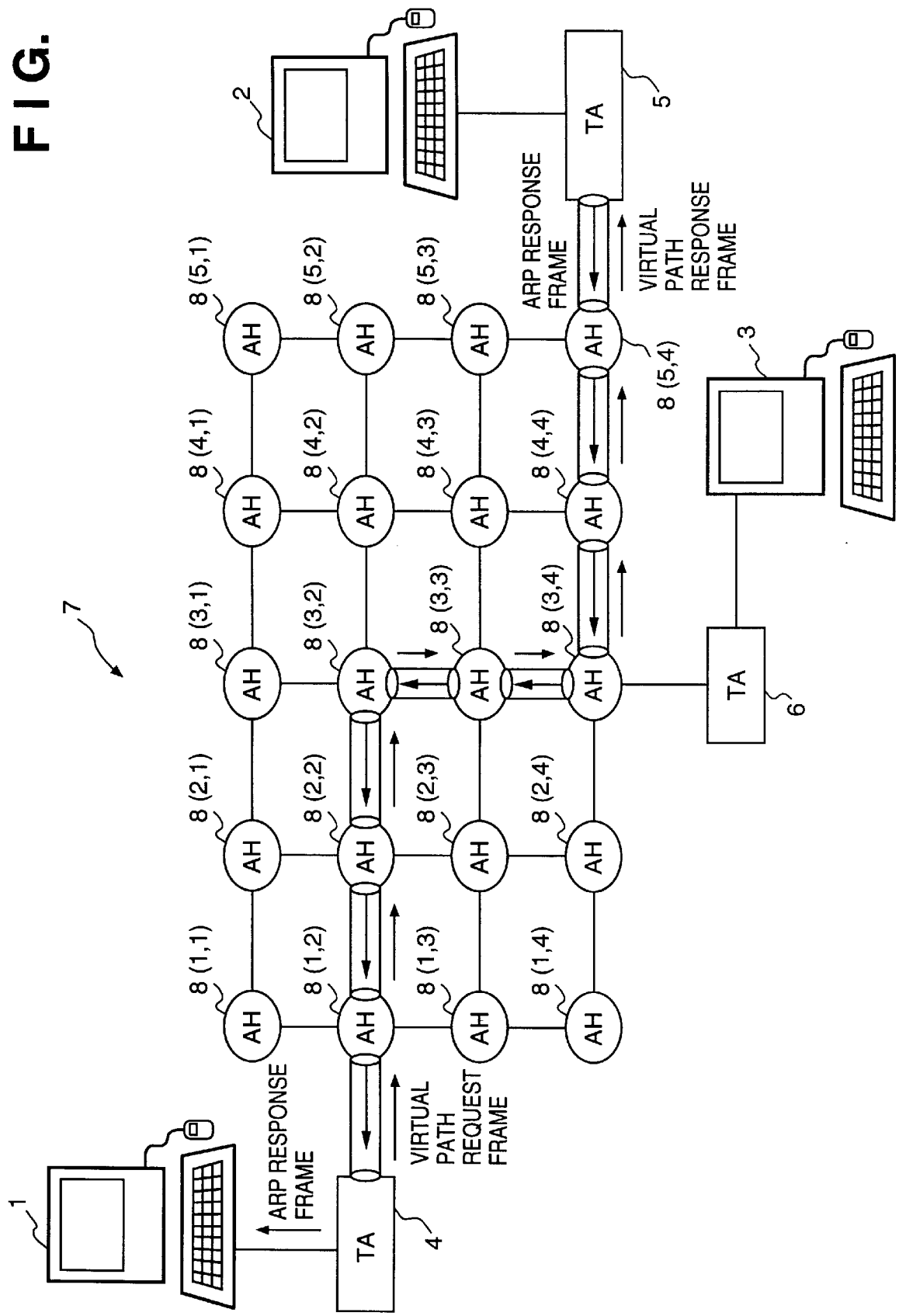
FIG. 9 is an explanatory view showing a state when routing is performed after negotiation by the virtual path request frame and the virtual path response frame.

Then, after the first ATM terminal adapter 4 determines that the MAC addresses are identical and recognizes the virtual path request frame, a virtual path response frame is transmitted toward the second ATM terminal adapter 5 via a route shown in FIG. 9, in accordance with the interface information stored in each ATM branching unit 8. When the virtual path response frame is passed from one ATM branching unit to the next one, information for identifying the ATM branching unit from which the virtual path response frame is transmitted is added in the VPI field 27 and the VCI field 28. In other words, the virtual path response is transferred through the most effective route, selected as described above, in the opposite direction. At this time, each ATM branching unit 8 stores the VPI and VCI information of the previous ATM branching unit 8 from which the virtual path response frame is transmitted, as well as the interface information and the VPI and VCI information which were stored during transferring the virtual path request frame, in the table 11 as the most effective virtual path, thus establishing the virtual path (F6).

Then, after finishing the process F4, the ARP response frame stored in the second ATM terminal adapter 5 is transferred to the first terminal 1 via the established virtual path, e.g., 8(5, 4) → 8(4, 4) → . . . → 8(2, 2) → 8(1, 2) (F7). Thereafter, data is transmitted and received via the above virtual path (F8, F9).

In other words, the VPI and VCI values written in the header of the incoming ATM frame, the VPI and VCI values to be written in the header of the outgoing ATM frame, and interface information, designating to which interface the ATM frame is to be outputted, are corresponded and stored in the table 11 of each ATM branching unit 8. Accordingly, each ATM branching unit 8 can exchange (transfer) ATM cells at high speed via the most effective path in the network, set by using tables.

Figure 10:
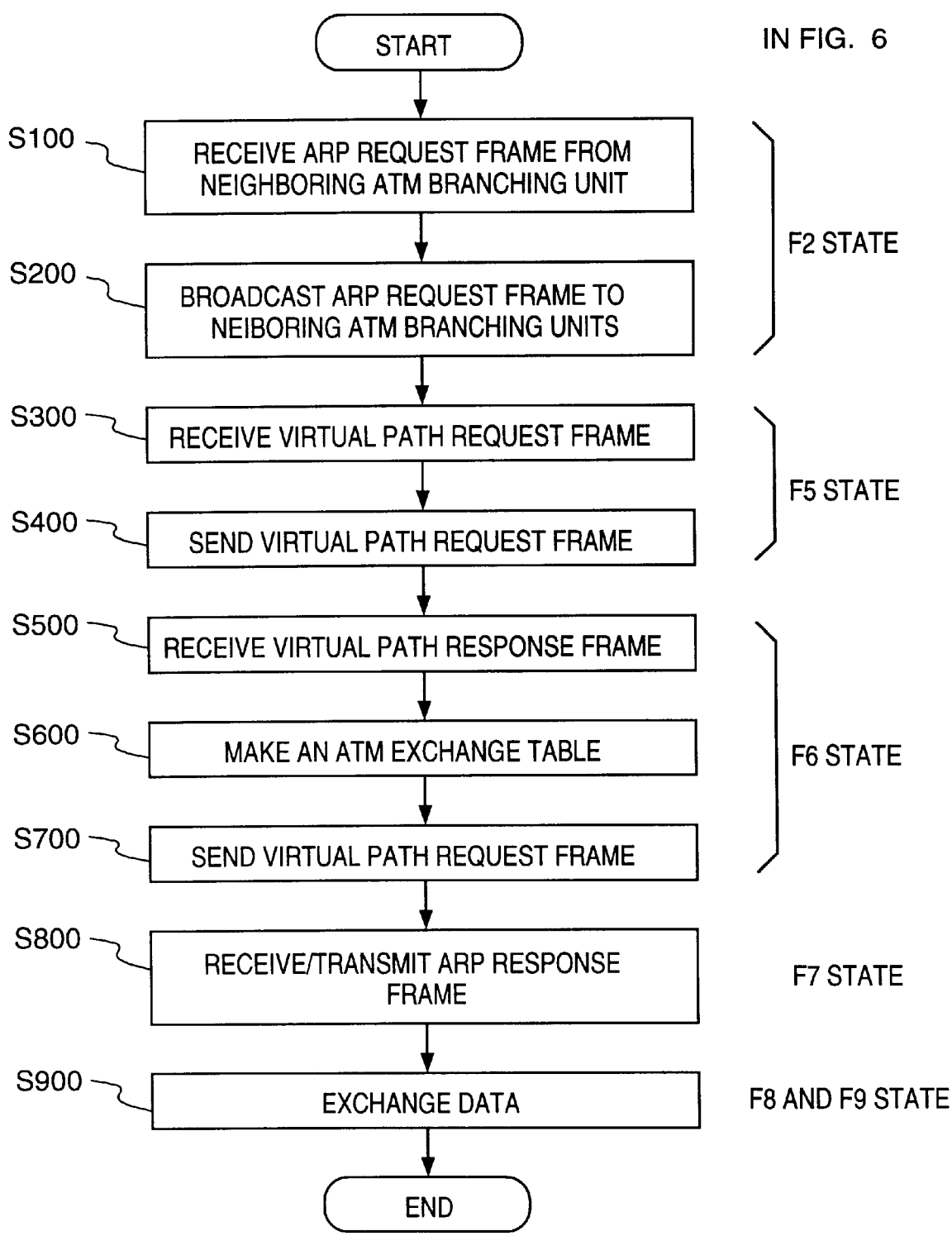
FIG. 10 is a flowchart showing a method of routing in a network.

FIG. 10 is a flowchart performed by each ATM branching unit. The comments on the right side of the flowchart corresponds to the processes in FIG. 6.

At step S100, ARP request frames, transmitted from neighboring ATM branching units, are received. In this step, the ARP request frames are broadcasted from a plurality of the ATM branching units. The header of the received ARP request frames include VPI and VCI values of the controller, which are common for all the ATM branching units.

At step S200, the ARP request frame is broadcasted to the neighboring ATM branching units. The header of this ARP request frame also includes a common VPI and VCI values of the controller.

Next at step S300, a broadcasted virtual path request frame is received. The header of the received virtual path request frame also includes common VPI and VCI values of the controller. There is a case that the virtual path request frames are inputted via a plurality of input terminals, and in such the case, the interface information of the virtual path request frame which arrived first and the VPI and VCI values of the neighboring transferring ATM branching unit, stored in the data field of the frame, are stored in the table for the ATM cell exchange. For example, in FIG. 11, if the ATM branching unit A determined that the frame from the ATM branching unit C arrived first, then the ATM branching unit A stores the interface information based on the arrived frame and the VPI and VCI values of the ATM branching unit C.

Then the process proceeds to step S400 where the virtual path request frame is broadcasted to the neighboring ATM branching units. The common VPI and VCI values of the controller is set in the header of the frame, and the VPI and VCI values of the transferring ATM branching unit is set in the data field.

Figure 11:
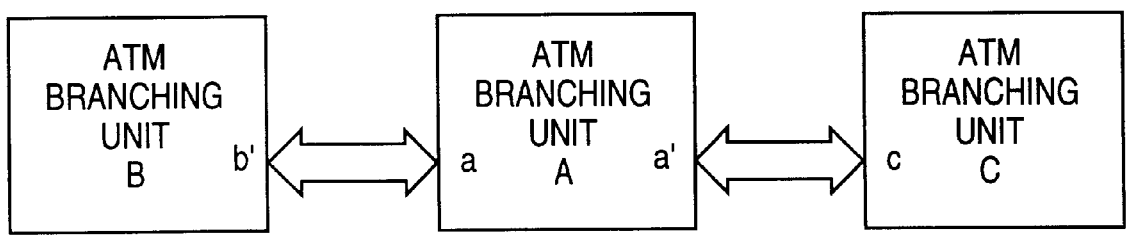
FIG. 11 is an explanatory view showing how values of virtual path identifier (VPI) and virtual channel identifier (VCI) are exchanged.

Referring to FIG. 11, for example, when the ATM branching unit A transmits the virtual path request frame to the ATM branching unit B, the common VPI and VCI values of the controller are set in a header, and the VPI and VCI values a are set as data.

At step S500, the virtual path response frame is received from only one neighboring ATM branching unit. This frame has the VPI and VCI values in the data field set at step S400, as data of the header. Then, the VPI and VCI values in the data field of the virtual path response frame are stored in the table. For example, in FIG. 11, when the response frame is received from the ATM branching unit B, the VPI and VCI values a are set in its header field, and VPI and VCI values b' is set in its data field.

Next at step S600, the information on interface (interface information) through which the virtual path request frame is received first at step S300, the VPI and VCI values of the data field of the received frame, and VPI and VCI values of the data field of the virtual path response frame received at step S500 are entered into an exchange table. For example, the ATM branching unit A in FIG. 11 stores the VPI and VCI values of b', the VPI and VCI values c, and the interface information indicating the interface through which data is to be transmitted, in the table.

At step S700, each ATM branching unit on a route through which the virtual path request frame is transmitted adds the VPI and VCI values of itself to the virtual path response frame and responds to the ATM branching unit from which the virtual path request frame is initiated. For example, in FIG. 11, the ATM branching unit A sends a virtual path response frame in which the VPI and VCI values a' are added to the ATM branching unit C.

The process proceeds to step S800 where the ATM branching unit receives the ARP response frame, and transmits the received ARP response frame after changing it in accordance with the table made at step S600.

Next at step S900, the ATM data is transmitted and received in accordance with the table made at step S600.

According to the first embodiment as described above, it is possible to establish a virtual path in the ATM network during a sequence for obtaining a destination MAC address by transmitting/receiving the ARP request/response frame, thus, it is possible to establish the most effective route by using LAN protocols between terminals, without dealing with ATM network.

Further, since the data exchange is performed by using exchange tables, it is possible to exchange data at high speed.

<Second Embodiment>

Figure 12:
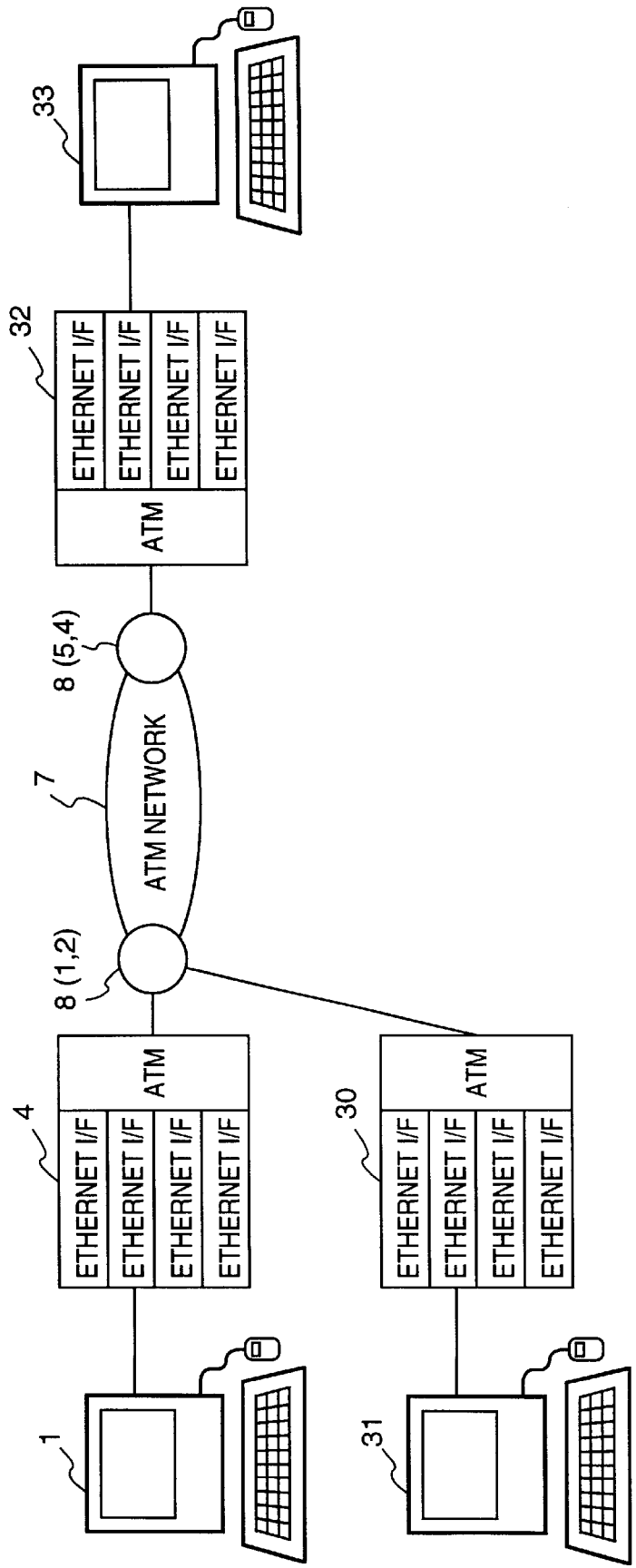
FIG. 12 is an overall view illustrating an example of a configuration of a communication system according to a second embodiment of the present invention.

FIG. 12 is an overall view illustrating an example of a configuration of a communication system according to a second embodiment of the present invention. As shown in FIG. 12, first and second ATM terminal adapters 4 and 30 are connected to the ATM branching unit 8(1, 2), and first and second communication terminals 1 and 31 are connected to the first and second ATM terminal adapters 4 and 30, respectively. Further, a third ATM terminal adapter 32 is connected to the ATM branching unit 8(5, 4), and a third communication terminal 33 is connected to the third ATM terminal adapter 32. In the second embodiment, the path between the first communication terminal 1 and the second communication terminal 31 is the subject to routing, as in the first embodiment.

Figure 13:
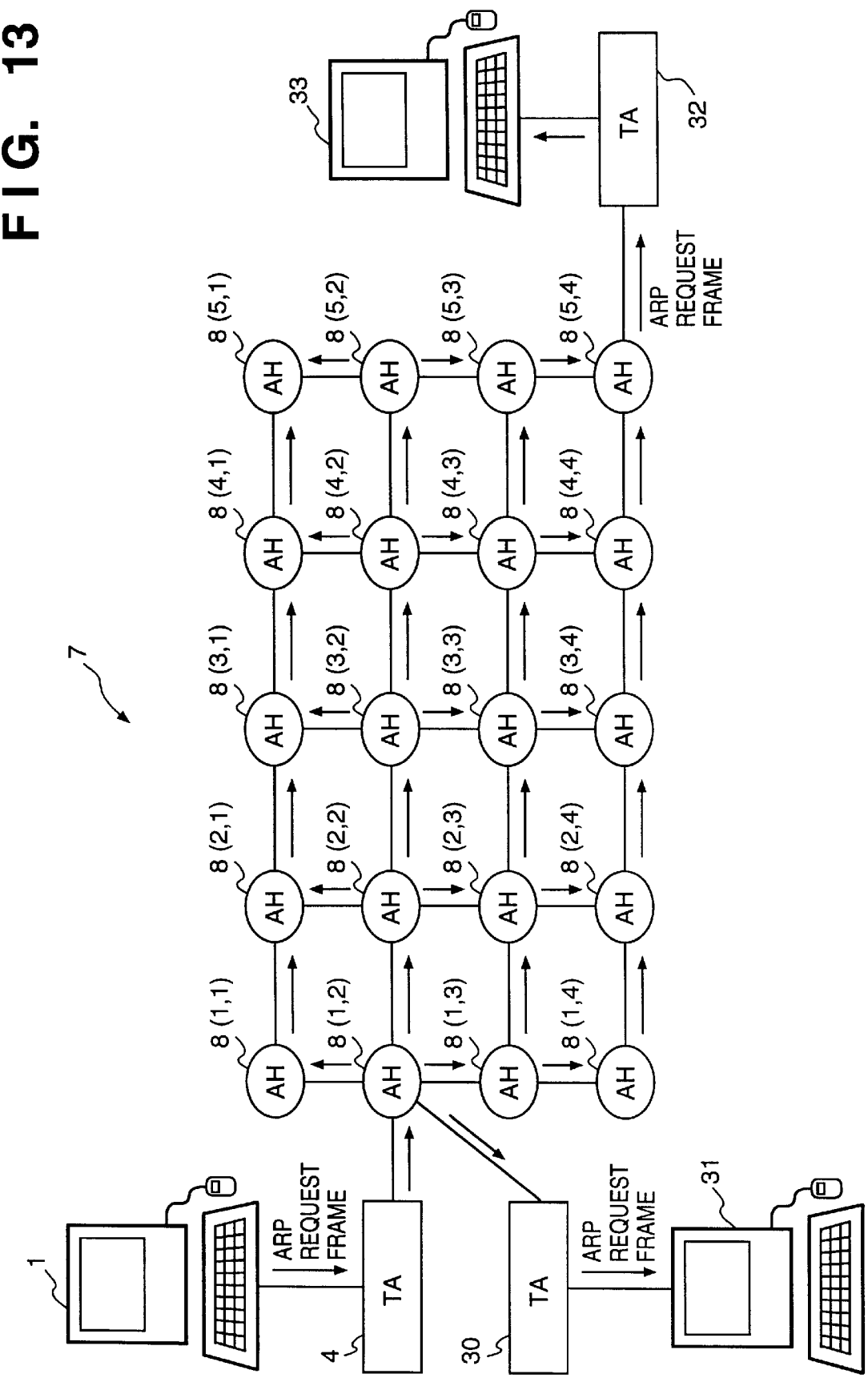
FIG. 13 is an explanatory view when an ARP request frame is broadcasted to the ATM branching units on a network.
Figure 14:
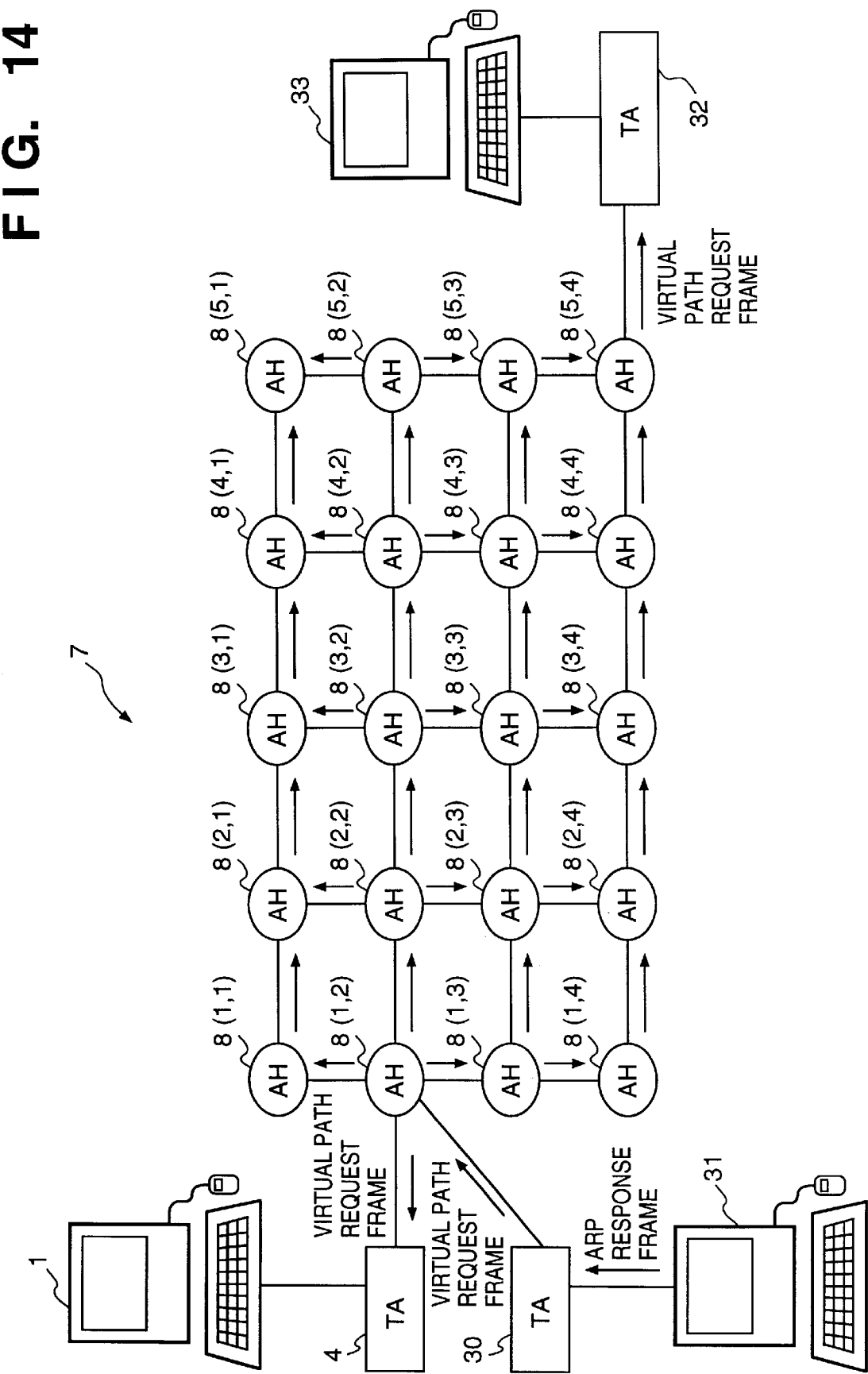
FIG. 14 is an explanatory view when a virtual path request frame is broadcasted to the ATM branching units on a network.
Figure 15:
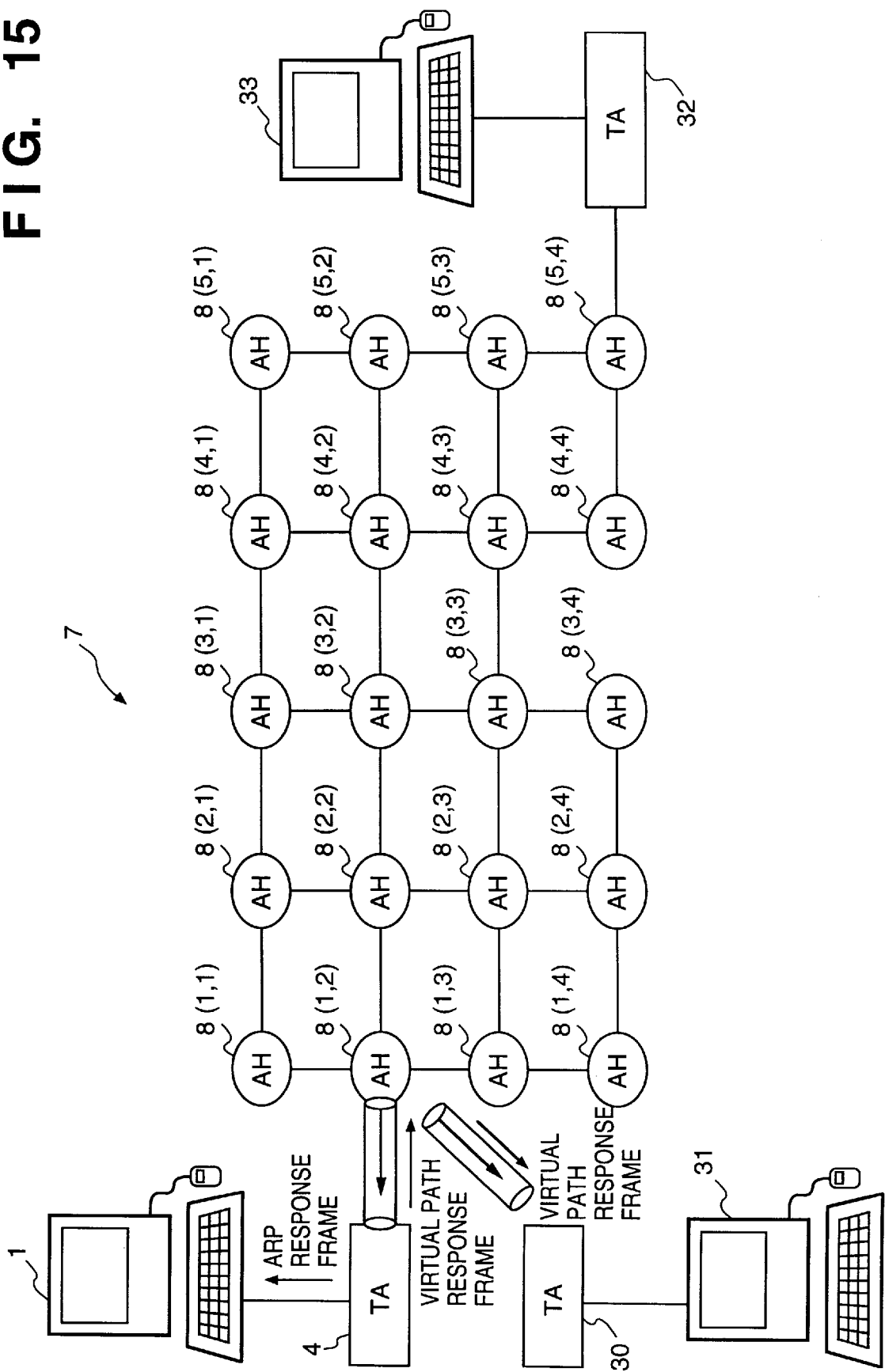
FIG. 15 is an explanatory view showing a state when a routing is performed after negotiation by the virtual path request frame and the virtual path response frame.

Similarly to the first embodiment, after an ARP request frame is divided into two ATM cells by the first ATM terminal adapter 4, the ATM cells are broadcasted to the ATM branching terminals 8(m, n) on the network 7, as shown in FIG. 13. The ARP request frame is transferred to the second communication terminal 31 via the second ATM terminal adapter 30, and also to the third communication terminal 33 via the third ATM terminal adapter 32. Thereafter, in the second and third communication terminals 31 and 33, the IP address in the IP data frame field 17 of the ARP request frame is compared to the respective IP addresses of the second and third communication terminals 31 and 33. If it is determined that the IP address in the IP data frame field 17 is identical to the IP address of the second communication terminal 31, as similarly to the aforesaid first embodiment, only the second communication terminal 31 sends an ARP response frame to the second ATM terminal adapter 30. After the second ATM terminal adapter 30 temporarily stores the received ARP response frame in its storage unit, it transfers a virtual path request frame (FIG. 5) to the ATM branching units 8 on the network 7, as in the first embodiment. Next, identification information of the originating ATM terminal adapter, namely the second ATM terminal adapter 30, is informed to the ATM branching unit 8(1, 2) by using the VPI and VCI values, then the virtual path request frame is broadcasted to each ATM branching units 8 on the network 7, as shown in FIG. 14. Then, when the virtual path request frame arrives at the first ATM terminal adapter 4 via the ATM branching unit 8(1, 2) and the first ATM terminal adapter 4 recognizes the virtual path request frame, then the first ATM terminal adapter 4 sends a response to the request to the second ATM terminal adapter 30. Thereafter, an ARP response frame, stored in the second ATM terminal adapter 30, is transmitted to the first communication terminal 1 via the virtual path, thus establishing the virtual path, as shown in FIG. 15.

In the second embodiment as described above, similarly to the first embodiment, it is possible to establish a virtual path in the ATM network during a sequence for obtaining a destination MAC address by transmitting/receiving the ARP request/response frame, thus, it is possible to establish the most effective route by using LAN protocols between terminals, without dealing with ATM network.

Further, in the aforesaid first and second embodiment as described above, an ATM terminal adapter is provided independently from the communication terminal and a plurality of ATM branching units are arranged on the network. However, the present invention is not limited to this, and it is also preferred to combine the ATM terminal adapter, the ATM branching unit, and a communication terminal by providing the former two unit in the communication terminal. More specifically, it is also preferred to put the ATM terminal adapter on the aforesaid communication terminal which operates on the ATM network so that the communication terminal has an extended function. Further, by combining the ATM branching unit to the above communication terminal, network management can be performed by a communication apparatus.

According to the relaying path setting method and the communication system on the network of the present invention, when information is to be exchanged via LANs which are connected to an ATM network, a most effective virtual path can be easily established without dealing with the ATM network, thereby it is possible to transmit desired data at high speed through the established virtual path.

Further, by adding a terminal adapter and a switching unit to a communication terminal, function of a communication apparatus can be extended and the network can be managed by the communication apparatus.

The present invention is not limited to the above embodiments and various changes and modifications can be made within the spirit and scope of the present invention. Therefore to appraise the public of the scope of the present invention, the following claims are made.

What is claimed is:

1. A relaying path setting method in a network when a first communication terminal communicates with a second communication terminal via a plurality of branching units, said method comprising:

first step of sending a predetermined request frame which includes identification information of the second communication terminal from the first communication terminal to the second communication terminal via the plurality of branching units;

a second step of sending a virtual path request frame used for specifying a branching unit to be used in communicating between the first and second communication terminals from an adapter to which the second communication terminal is connected to an adapter to which the first communication terminal is connected on the basis of a predetermined response frame responding to the predetermined request frame sent from the second communication terminal which received the predetermined request frame, and specifying the branching units to be used in the communication between the first and second communication terminals on the basis of the sent virtual path request frame;

a third step of sending a virtual path response frame responding to the virtual path request frame from the adapter to which the first communication terminal is connected to the adapter to which the second communication terminal is connected, via the specified branching units and establishing a virtual path on the basis of the sent virtual path response frame; and a fourth step of sending back the predetermined response frame which corresponds to the predetermined request frame via the virtual path established at said third step, and setting a relaying path between the first and second communication terminals on the basis of the predetermined response frame.

2. The relaying path setting method according to claim 1, wherein said first communication terminal communicates with the second communication terminal in an asynchronous transfer mode.

3. The relaying path setting method according to claim 1, wherein, at said first step, the predetermined request frame is broadcasted via the plurality of branching units.

4. The relaying path setting method according to claim 1, wherein, at said second step, the virtual path request frame is broadcasted.

5. The relaying path setting method according to claim 4, wherein each of said plurality of branching units stores identification information of a branching unit from which the virtual path request frame arrived first among all arrived virtual path request frames broadcasted from different branching units, and identification information of a branching unit from which the received virtual path response frame is sent in a table, and exchanges data on the basis of the information stored in the table.

6. The relaying path setting method according to claim 1, wherein, at said first step, a predetermined request frame including an IP address of the second communication terminal is transmitted.

7. The relaying path setting method according to claim 5, wherein each of the plurality of branching units stores VPI and VCI values as identification information of the branching unit in the table.

8. A relaying path setting method in a network when a first communication terminal communicates with a second communicating terminal via a asynchronous transfer mode exchange system, said method comprising:

a first step of sending predetermined request information which includes first identification information that is terminal identification information of the second communication terminal from the first communication terminal to a first terminal adapter;

a second step of sending the predetermined request information from the first terminal adapter to a second terminal adapter via a plurality of branching units;

a third step of sending the predetermined request information from the second terminal adapter to the second communication terminal;

a fourth step of sending predetermined response information, responding to the predetermined request information, which includes second identification information of the second communication terminal, that is a media access control information in the network, to the second terminal adapter;

a fifth step of temporarily storing the predetermined response information and sending virtual path request information which is on the basis of the predetermined response information and includes the second identification information to the first terminal adapter via the plurality of branching units and specifying branching units relating to a virtual path on the basis of the sent virtual path request information;

a sixth step of sending virtual path response information, responding to the virtual path request information, which includes the second identification information to said second terminal adapter via the specified branching units and establishing the virtual path on the basis of the sent virtual path response information; and a seventh step of sending the temporarily stored predetermined response information to the first communication terminal through the established virtual path determining a relaying path between the first communication terminal and the second communication terminal on the basis of the sent predetermined response information.

9. The relaying path setting method according to claim 8, wherein the first identification information is an IP address.

10. The relaying path setting method according to claim 8, wherein each of said plurality of branching units stores identification information of a branching unit from which the virtual path request information is arrived first among all arrived virtual path request information broadcasted from different branching units, and identification information of a branching unit from which the received virtual path response information is sent in a table, and exchanges data on the basis of the information stored in the table.

11. A communication system, to which a first communication terminal and a second communication terminal can be connected, which controls a communication between the first and second communication terminals via a plurality of branching units, said system comprising:

first detection means for detecting a predetermined request frame, including identification information of the second communication terminal, which is sent from the first communication terminal to the second communication terminal;

first sending means for sending the predetermined request frame to the second communication terminal in response to the detection of the predetermined request frame by said first detection means;

second detection means for detecting a predetermined response frame responding to the predetermined request frame which is transmitted from the second communication terminal which received the predetermined request frame sent by said first sending means to the first communication terminal;

second sending means for sending a virtual path request frame used for specifying branching units to be used in communication between the first and second communication terminals in response to the detection of the predetermined response frame by said second detection means;

specification means for specifying the branching units to be used in the communication between the first and second communication terminals on the basis of the virtual path request frame sent by said second sending means;

third sending means for sending a virtual path response frame responding to the virtual path request frame via the branching units specified by said specification means;

establishment means for establishing a virtual path to be used in the communication between the first and second communication terminals on the basis of the virtual path response frame sent by said third sending means;

fourth sending means for sending the predetermined response frame detected by said second detection means via the virtual path established by said establishment means; and setting means for setting a relaying path between the first and second communication terminals on the basis of the predetermined response frame sent by said fourth sending means.

12. The communication system according to claim 11, wherein the communication system communicates in an asynchronous transfer mode.

13. The communication system according to claim 11, wherein the first sending means broadcasts the predetermined request frame.

14. The communication system according to claim 11, wherein said second sending means broadcasts the virtual path request frame.

15. The communication system according to claim 11, wherein said specification means specifies a branching unit which sent a virtual path request frame that reached first among broadcasted virtual path request frames as one of the branching units to be used in the communication between the first and second communication terminals.

16. The communication system according to claim 14, wherein said establishment means stores identification information of a branching unit which sent a virtual path request frame that reached first among broadcasted virtual path request frames and identification information of a branching unit which sent the received virtual path response frame in a table, and establishes the virtual path to be used in the communication between the first and second communication terminals on the basis of the identification information stored in the table.

17. The communication system according to claim 11, wherein said first sending means sends the predetermined request frame including an IP address of the second communication terminal.

18. The communication system according to claim 16, wherein said establishment means stores VPI/VCI values in the table as the identification information of the branching unit.

19. A communication apparatus in a communication system, to which a first communication terminal and a second communication can be connected, which controls a communication between the first and second communication terminals via a plurality of communication units, said apparatus comprising:

first detection means for detecting a predetermined request frame, including identification information of the second communication terminal, which is sent from the first communication terminal to the second communication terminal;

first sending means for sending the predetermined request frame to the second communication terminal in response to the detection of the predetermined request frame by said first detection means;

second detection means for detecting a virtual path request frame, used for specifying communication units to be used in the communication between the first and second communication terminals, which is sent from another communication unit that detected a predetermined response frame responding to the predetermined request frame sent from the second communication terminal that received the predetermined request frame sent by said first sending means to the first communication terminal;

specification means for specifying the communication units to be used in the communication between the first and second communication terminals on the basis of the virtual path request frame detected by said second detection means;

second sending means for sending the virtual path response frame to the adjacent communication units in response to the detection of the virtual path request frame by said second detection means;

third detection means for detecting a virtual path response frame responding to the virtual path request frame sent via the communication units specified by said specification means;

establishment means for establishing a virtual path to be used in the communication between the first and second communication terminals on the basis of the virtual path response frame detected by said third detection means;

fourth detection means for detecting the predetermined response frame sent via the virtual path established by said establishment means;

setting means for setting a relaying path between the first and second communication terminals on the basis of the predetermined response frame detected by said fourth detection means; and third sending means for sending the predetermined response frame detected by said fourth detection means via the virtual path established by said establishment means.

20. The communication apparatus according to claim 19, wherein the communication apparatus communicates in an asynchronous transfer mode.

21. The communication apparatus according to claim 19, wherein said first sending means broadcasts the predetermined request frame.

22. The communication apparatus according to claim 19, wherein said second sending means broadcasts the virtual path request frame.

23. The communication apparatus according to claim 22, wherein said specification means specifies a communication unit which sent a virtual path request frame that reached first among broadcasted virtual path request frames as one of the communication units to be used in the communication between the first and second communication terminals.

24. The communication apparatus according to claim 22, wherein said establishment means stores identification information of a communication unit which sent a virtual path request frame that reached first among broadcasted virtual path request frames and identification information of a communication unit which sent the received virtual path response frame in a table, and establishes the virtual path to be used in the communication between the first and second communication terminals on the basis of the identification information stored in the table.

25. The communication apparatus according to claim 19, wherein said first sending means sends the predetermined request frame including an IP address of the second communication terminal.

26. The communication system according to claim 24, wherein said establishment means stores VPI/VCI values in the table as the identification information of the communication unit.

27. A control method for controlling a communication apparatus in a communication system, to which a first communication terminal and a second communication terminal can be connected, which controls a communication between the first and second communication terminals via a plurality of communication units, said method comprising:

a first detection step of detecting a predetermined request frame, including identification information of the second communication terminal, which is sent from the first communication terminal to the second communication terminal;

a first sending step of sending the predetermined request frame to the second communication terminal in response to the detection of the predetermined request frame in said first detection step;

a second detection step of detecting a virtual path request frame, used for specifying communication units to be used in the communication between the first and second communication terminals, which is sent from another communication unit that detected a predetermined response frame responding to the predetermined request frame sent from the second communication terminal that received the predetermined request frame sent in said first sending step to the first communication terminal;

a specification step of specifying the communication units to be used in the communication between the first and second communication terminals on the basis of the virtual path request frame detected in said second detection step;

a second sending step of sending the virtual path response frame to the adjacent communication units in response to the detection of the virtual path request frame in said second detection step;

a third detection step of detecting a virtual path response frame responding to the virtual path request frame sent via the communication units specified in said specification step;

an establishment step of establishing a virtual path to be used in the communication between the first and second communication terminals on the basis of the virtual path response frame detected in said third detection step;

a fourth detection step of detecting the predetermined response frame sent via the virtual path established in said establishment step;

a setting step of setting a relaying path between the first and second communication terminals on the basis of the predetermined response frame detected in said fourth detection step; and a third sending step of sending the predetermined response frame detected in said fourth detection step via the virtual path established in said establishment step.

28. The control method according to claim 27, wherein the communication units communicate in an asynchronous transfer mode.

29. The control method according to claim 27, wherein, in said first sending step, the predetermined request frame is broadcast.

30. The control method according to claim 27, wherein, in said second sending step, the virtual path request frame is broadcast.

31. The control method according to claim 30, wherein, in said specification step, a communication unit which sent a virtual path request frame that reached first among broadcasted virtual path request frames is specified as one of the communication units to be used in the communication between the first and second communication terminals.

32. The control method according to claim 30, wherein, in said establishment step, identification information of a communication unit which sent a virtual path request frame that reached first among broadcasted virtual path request frames and identification information of a communication unit which sent the received virtual path response frame are stored in a table, and the virtual path to be used in the communication between the first and second communication terminals is established on the basis of the identification information stored in the table.

33. The control method according to claim 27, wherein, in said first sending step, the predetermined request frame including an IP address of the second communication terminal is sent.

34. The control method according to claim 32, wherein, in said establishment step, VPI/VCI values are stored in the table as the identification information of the communication unit.

\* \* \* \* \*

UNITED STATES PATENT AND TRADEMARK OFFICE
CERTIFICATE OF CORRECTION

PATENT NO. : 5,930,255  Page 1 of 1
DATED : July 27, 1999
INVENTOR(S) : Takahiro Tsukamoto et al.

It is certified that error appears in the above-identified patent and that said Letters Patent is hereby corrected as shown below:

Title page,
Item [75], delete "Houya" following "Takahiro Tsukamoto" and insert therefor
-- Tokyo --.
After Item [73] and before Item [21], insert
-- [*] Notice: This patent issued on a continued prosecution application filed under 37 CFR 1.53(d), and is subject to the twenty year patent term provisions of 35 U.S.C. 154 (a)(2). --.

Column 5,
Line 53, delete "(not shown)" and insert therefor -- (now shown) --.

Column 7,
Line 36, delete "a are" and insert therefor -- $\underline{a}$ are --.
Line 44, delete "a are" and insert therefor -- $\underline{a}$ are --.
Line 45, delete "b' is" and insert therefor -- $\underline{b'}$ is --.
Line 53, delete "of b'," and insert therefor -- of $\underline{b'}$, --; delete "values c," and insert therefor -- values $\underline{c}$, --.
Line 62, delete "a' are" and insert therefor -- $\underline{a'}$ are --.

Column 9,
Line 42, delete "first step" and insert therefor -- a first step --.

Signed and Sealed this

First Day of July, 2003

JAMES E. ROGAN
*Director of the United States Patent and Trademark Office*